Oct. 28, 1924.

J. F. O'CONNOR 1,513,127

FRICTION SHOCK ABSORBING MECHANISM

Filed Nov. 13, 1922    2 Sheets-Sheet 1

Witnesses
Wm. Geiger

Inventor
John F. O'Connor
By Geo. J. Haight
his Atty.

Oct. 28, 1924.

J. F. O'CONNOR 1,513,127

FRICTION SHOCK ABSORBING MECHANISM

Filed Nov. 13, 1922  2 Sheets-Sheet 2

Witnesses
Wm. Geiger

Inventor
John F. O'Connor
By Geo. J. Haight
his Atty

Patented Oct. 28, 1924.

1,513,127

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 13, 1922. Serial No. 600,565.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein high capacity is obtained by means of a pressure-transmitting friction plunger and spring-influenced gripping elements cooperable therewith.

More specifically, an object of the invention is to provide a mechanism of the type indicated wherein the spring resistance performs the double function of directly resisting movement of the plunger during a compression stroke and also maintains the friction gripping elements in taut relation with the parts associated therewith.

Another specific object of the invention is to provide a mechanism of the friction plunger type which is of compact form and in which large wearing areas on the gripping elements and friction plunger are obtained.

Figure 1:
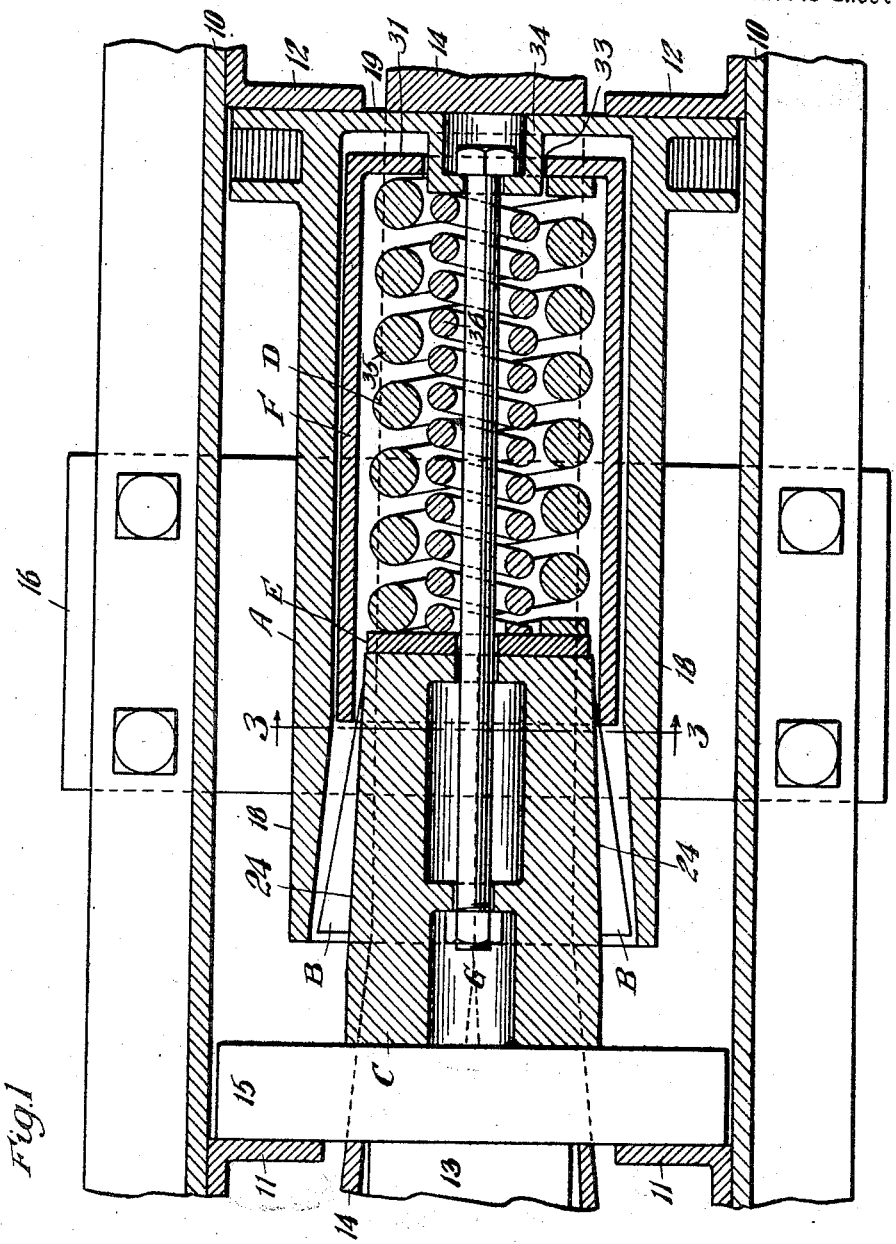
Figure 2:
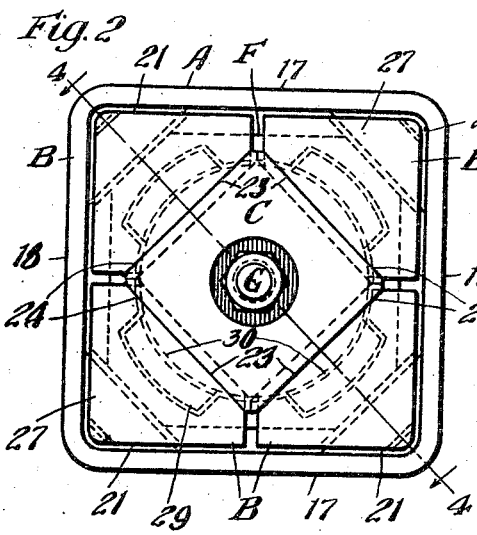
Figure 4:
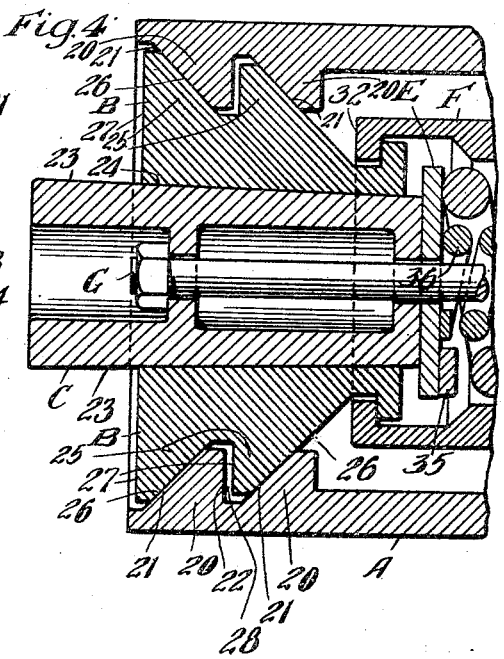
Figure 3:
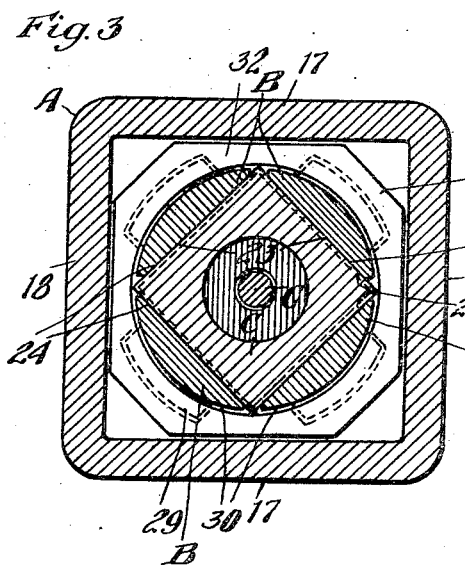
Figure 5:
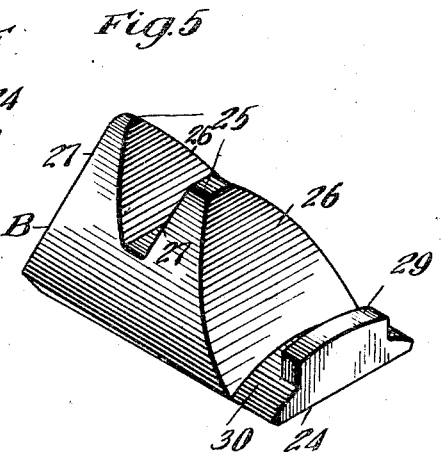

In the drawings forming a part of this specification, Figure 1 is a horizontal longitudinal sectional view of a portion of a railway draft rigging showing my improvements in connection therewith. Figure 2 is a front end elevation of the shock absorbing mechanism proper. Figure 3 is a vertical transverse sectional view of the shock absorbing mechanism proper corresponding to the line 3—3 of Figure 1. Figure 4 is a longitudinally diagonal sectional view of the shock absorbing mechanism proper, corresponding to the line 4—4 of Figure 2. And Figure 5 is a detail perspective of one of the friction gripping elements.

In said drawings, 10—10 denote channel draft sills of a car underframe, to the inner faces of which are secured front stop lugs 11 and rear stop lugs 12. A portion of a drawbar is indicated at 13, the same being operatively connected with a hooded cast yoke 14 within which is disposed the shock absorbing mechanism proper and a front follower 15. The yoke and parts therewithin are supported in operative position by a detachable saddle plate 16.

The improved shock absorbing mechanism proper, as shown, comprises a container A; four friction gripping elements B—B; a friction plunger C; a spring resistance D; a spring follower E; a hanger F; and a retainer bolt G.

The container or shell A is of rectangular cross section, having top and bottom walls 17—17, side walls 18—18, and integral rear wall 19, the latter being suitably extended laterally and reinforced to adapt it to function as the rear follower of the mechanism. At its forward or outer end, the shell A is provided in each corner thereof with a plurality of longitudinally separated inwardly extended enlargements 20—20, each of which has a wedge face 21 thereon and a rearwardly facing transverse shoulder 22. The planes of the wedge faces 21 extend at right angles to the diagonals of the shell, as will be clear from an inspection of Figures 2 and 4 and preferably there are two such wedge faces 21 in each corner.

The friction plunger C is centrally disposed within the shell A and is of square cross section, as best indicated in Figures 2 and 3, thereby providing four longitudinally extending flat friction surfaces 23—23 which are converged slightly inwardly of the shell. The plunger C is turned thru an angle of 45° with respect to the square shell, that is, a diagonal of the plunger will intersect a diagonal of the shell at an angle of 45° as clearly shown in Figure 3. This serves to bring the friction faces 23 of the plunger opposite the wedge faces 21 of the shell.

The gripping elements B, four in number, are of like construction, each having an inner flat friction surface 24 cooperable with one of the corresponding friction surfaces 23 of the plunger C. On its outer side, each gripping element B is formed with two extensions 25—25, longitudinally separated, each extension having an inclined wedge face 26 cooperable with one of the corresponding shell wedge faces 21, as shown in Figure 4. The extensions 25 also provide forwardly facing transversely extending shoulders 27, so spaced longitudinally that there is left an appreciable clearance as indicated at 28 between the innermost shoulder 27 of each gripping element and the corresponding adjacent rearwardly facing shoulder 22 of the shell. At its inner end, each element B is provided with a laterally extended arcuate flange 29 between which and the nearest extension 25 is formed an arcuate surface 30, to accommodate the attaching flange of the hanger F, hereinafter specifically described. As clearly shown in Figure 4, the front ends of the gripping elements B are normally disposed inwardly of the outer end of the shell A so as to allow for a slight forward or differential movement of said elements B during a compression stroke. The length of said elements B is such that the inner end of the plunger C normally projects inwardly a short distance beyond the inner ends of the elements B.

The hanger or spring cage F is an eight-sided affair with an integral inner transversely extending wall 31 and a front flange 32, the latter having a circular opening therein, as best shown in Figure 3 and beneath which engage the flanges 29 of the four gripping elements B. The said inner wall 31 of the hanger or cage F is apertured as indicated at 33 to adapt it to loosely fit over the hollow boss 34 formed integral with the inner wall 19 of the shell A. It will be noted that the inner wall 31 of the hanger F is normally spaced from the wall 19 of the shell A.

The spring D, as shown, consists of an outer relatively heavy coil 35 and a nested inner lighter coil 36. Both of said coils 35 and 36 bear, at their front ends, upon the spring follower E which in turn bears upon the inner end of the plunger C. The outer coil 35 bears at its inner end upon the wall 31 of the hanger F whereas the inner coil 36 bears at its inner end upon the boss 34 of the shell A, as fully shown in Figure 1.

The retainer bolt G is anchored at its inner end within the said hollow boss 34 and at its forward end within a suitable recess provided in the plunger C, the latter and the follower E being suitably apertured to accommodate the shank of the bolt.

The operation of the mechanism, assuming a compression stroke under buff, is as follows. As the drawbar and front follower 15 move inwardly, the plunger C travels longitudinally in unison therewith. This movement of the plunger C is directly resisted by the inner coil 36 of the spring resistance. In addition, the movement of the plunger C is frictionally resisted by the gripping elements B which are constantly urged inwardly of the shell under the influence of the outer coil 35 of the spring resistance, which exerts its tension upon the elements B through the hanger or cage F. There will also be the additional resistance afforded by said outer coil 35 acting directly upon the plunger C. Due to the taper of the plunger C, a slight differential action will take place which is accommodated by combined outward radial and forward or reverse movement of the gripping elements B. In this connection, it will be observed that the effective action of the gripping elements B will be proportional to the compression of the coil 35 which in turn is proportional to the movement of the plunger C. Upon discontinuance of the actuating force, it will be seen that the stored up energy in the inner coil 36 is immediately available to project the plunger C outwardly of the shell and should the gripping elements stick or jam with respect thereto, this same capacity is available, initially, to project the entire system of friction elements, outer coil 35 and hanger F, in a similar direction, inasmuch as the inner coil 36 reacts between said system of friction elements and the shell A. With this arrangement, comparatively blunt angles may be employed on the sets of wedge faces 21 and 26 to facilitate release without militating against the desired high frictional capacity.

From the preceding description, considered in connection with the drawings, it will be seen that I have provided a very compact arrangement with a large amount of frictional wearing areas, the latter resulting principally from the fact that the gripping elements are arranged in the corners of the shell, thereby permitting the plunger to be made square and turned through an angle of 45° with respect to the shell, as previously described.

In assembling the mechanism, the hanger F will first be placed within the shell A; the two coils of the spring resistance are then inserted; next the follower E; the four gripping elements will then be hooked beneath the flange 32 of the hanger F; the plunger C will next be inserted between the four gripping elements; and finally the retainer bolt will be applied to place the springs under initial compression and also to hold all of the parts in assembled relation.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a shell; of a plurality of friction gripping elements having wedge engagement with the shell; a pressure-transmitting friction plunger interposed between and cooperable with said gripping elements; a spring interposed between said plunger and the shell; a second said spring arranged at one end to directly resist movement of said plunger relatively to the shell; and means interposed between the opposite end of said last named spring and the gripping elements, arranged to normally urge the gripping elements against the plunger.

2. In a friction shock absorbing mechanism, the combination with a shell; of a plurality of friction gripping elements having wedge engagement with the shell; a pressure-transmitting friction plunger interposed between and cooperable with said gripping elements; a spring interposed between said plunger and the shell; a second spring arranged at one end to directly resist movement of said plunger relatively to the shell; and means interposed between the opposite end of said last named spring and the gripping elements, arranged to normally urge the gripping elements against the plunger, said last named means comprising, a hanger having shouldered engagement with the gripping elements at one of its ends and upon which the second named spring bears at its other end.

3. In a friction shock absorbing mechanism, the combination with a shell of rectangular cross section having wedge faces in the corners thereof inclined toward the axis and inner end of the shell; four friction gripping elements having wedge faces cooperating with said shell wedge faces, said gripping elements being disposed in the corners of the shell and providing, on their sides nearest the axis of the shell, four longitudinally extending friction surfaces arranged in rectangular formation and angularly offset 45° with respect to the four sides of the shell; a pressure-transmitting friction plunger of rectangular cross section having four friction surfaces cooperable with the said friction surfaces of said gripping elements; and a spring resistance.

4. In a friction shock absorbing mechanism, the combination with a shell of rectangular cross section having wedge faces in the corners thereof inclined toward the axis and inner end of the shell; four friction gripping elements having wedge faces cooperating with the wedge faces of the shell, said gripping elements being disposed in the corners of the shell and providing, on their sides nearest the axis of the shell, four longitudinally extending friction surfaces arranged in rectangular formation and angularly offset 45° with respect to the four sides of the shell; a pressure-transmitting friction plunger of rectangular cross section having four friction surfaces cooperable with the said friction surfaces of said gripping elements; a spring resistance; and means interposed between said spring resistance and said gripping elements normally urging the latter inwardly against the friction plunger.

5. In a friction shock absorbing mechanism, the combination with a shell of rectangular cross section having wedge faces in the corners thereof inclined toward the axis and inner end of the shell; four friction gripping elements having wedge faces cooperating with the wedge faces of the shell, said gripping elements being disposed in the corners of the shell and providing, on their sides nearest the axis of the shell, four longitudinally extending friction surfaces arranged in rectangular formation and angularly offset 45° with respect to the four sides of the shell; a pressure-transmitting friction plunger of rectangular cross section having four friction surfaces cooperable with the said friction surfaces of said gripping elements; a spring resistance; and means interposed between said spring resistance and said gripping elements normally urging the latter inwardly against the friction plunger, said means comprising a hanger having shouldered engagment with said gripping elements.

6. In a friction shock absorbing mechanism, the combination with a shell having wedge faces on the interior thereof; a plurality of friction gripping elements having wedge faces cooperating with the wedge faces of the shell; a pressure-transmitting friction plunger interposed between and cooperating with said elements; a spring interposed between the inner end of said plunger and the shell; a second spring arranged to have one end thereof resist relative movement between the plunger and the shell; means interposed between the other end of said last named spring and the gripping elements adapted to normally urge the latter inwardly against the plunger, said second named spring and means floating with respect to the shell; and means for retaining said springs, gripping elements and plunger in assembled relation with the shell.

7. In a friction shock absorbing mechanism, the combination with a shell; of friction gripping elements having wedge engagement with the shell; a pressure-transmitting friction plunger cooperable with said gripping elements; a spring resistance for said plunger; means interposed between said gripping elements and spring resistance normally urging said elements inwardly of the shell; and means coacting with the shell for limiting outward movement of said plunger relatively to the shell.

8. In a friction shock absorbing mechanism, the combination with a shell having wedge faces on the interior thereof; of a plurality of friction gripping elements having wedge faces cooperating with the wedge faces of the shell; a pressure-transmitting friction plunger interposed between and cooperable with said gripping elements; a spring resistance coacting with said plunger at one end; means interposed between the opposite end of said spring resistance and said gripping elements arranged to urge the latter inwardly of the shell; and means anchored to the shell for limiting the outward movement of said plunger with reference to the shell.

In witness that I claim the foregoing I have hereunto subscribed my name this 25th day of October, 1922.

JOHN F. O'CONNOR.

Witnesses:
FRANCES SAVAGE,
H. M. DEAMER.